United States Patent
Waughtal et al.

(10) Patent No.: US 12,255,970 B2
(45) Date of Patent: Mar. 18, 2025

(54) EDGE NETWORK MONITORING AND ADAPTATION SYSTEMS

(71) Applicant: FCS Processing, LLC, Austin, TX (US)

(72) Inventors: Jeff Waughtal, Austin, TX (US); David Avery, Austin, TX (US)

(73) Assignee: FCS Processing, LLC, Austin, TX (US)

( * ) Notice: Subject to any disclaimer, the term of this patent is extended or adjusted under 35 U.S.C. 154(b) by 197 days.

(21) Appl. No.: 18/139,102

(22) Filed: Apr. 25, 2023

(65) Prior Publication Data

US 2024/0364794 A1  Oct. 31, 2024

(51) Int. Cl.
*H04L 67/565* (2022.01)
*H04L 67/1095* (2022.01)

(52) U.S. Cl.
CPC ........ *H04L 67/565* (2022.05); *H04L 67/1095* (2013.01)

(58) Field of Classification Search
None
See application file for complete search history.

(56) References Cited

U.S. PATENT DOCUMENTS

| | | |
|---|---|---|
| 5,255,182 A | 10/1993 | Adams |
| 5,532,466 A | 7/1996 | Konno et al. |
| 6,254,004 B1 | 7/2001 | Nagao et al. |
| 6,763,336 B1 | 7/2004 | Kolls |
| 7,349,871 B2 | 3/2008 | Labrou et al. |
| 7,364,070 B2 | 4/2008 | Chang |
| 7,774,402 B2 | 8/2010 | Singh et al. |
| 7,801,826 B2 | 9/2010 | Labrou et al. |
| 7,941,542 B2 | 5/2011 | Broda et al. |
| 8,548,859 B2 | 10/2013 | Maltkovic |
| 8,561,884 B2 | 10/2013 | Jimenez Alamo |
| 8,768,838 B1 | 7/2014 | Hoffman |
| 9,558,503 B2 | 1/2017 | Oh et al. |
| 10,607,203 B2 | 3/2020 | Goldberg |
| 10,854,049 B2 | 12/2020 | Waughtal |

(Continued)

FOREIGN PATENT DOCUMENTS

| | | |
|---|---|---|
| CA | 2001084779 A1 | 8/2001 |
| CN | 109215255 A | 1/2019 |

OTHER PUBLICATIONS

Ramchand et al., "Big data architectures for data lakes: A systematic literature review", Jun. 1, 2022, IEEE, 2022 IEEE 46th Annual Computers, Software, and Applications Conference (COMPSAC) (2022, pp. 1141-1146) (Year: 2022).*

*Primary Examiner* — Davoud A Zand
(74) *Attorney, Agent, or Firm* — Bryan L. Baysinger; Eric Mills; Maynard Nexsen PC

(57) ABSTRACT

Systems and methods for monitoring and adapting an edge network is provided. The system can include a plurality of user devices connected to a communications network and configured to capture input data and/or generate device data which can be transmitted to a data lake for storage and processing. A network monitoring station can leverage the data in the data lake to generate business intelligence to determine whether there is an issue within the system, for instance with respect to a user device or any other component of the network. Subsequently, an adaptive action can be triggered in response to a determination that an issue exists within the system.

20 Claims, 6 Drawing Sheets

(56) References Cited

U.S. PATENT DOCUMENTS

| | | |
|---|---|---|
| 10,896,425 B2 | 1/2021 | Waughtal |
| 10,990,980 B1 | 4/2021 | Reses et al. |
| 11,361,322 B2 | 6/2022 | Waughtal |
| 11,522,703 B1 * | 12/2022 | Jain ..................... H04L 9/0894 |
| 2002/0152124 A1 | 10/2002 | Guzman et al. |
| 2004/0128256 A1 | 7/2004 | Krouse et al. |
| 2005/0086286 A1 | 4/2005 | Gatto et al. |
| 2005/0086360 A1 | 4/2005 | Mamou et al. |
| 2007/0188749 A1 | 8/2007 | Brady et al. |
| 2007/0233603 A1 | 10/2007 | Schmidgall et al. |
| 2008/0051059 A1 | 2/2008 | Fisher |
| 2008/0147495 A1 | 6/2008 | Bal et al. |
| 2008/0270301 A1 | 10/2008 | Jones et al. |
| 2010/0051689 A1 | 3/2010 | Diamond |
| 2011/0276636 A1 | 11/2011 | Cheng et al. |
| 2013/0263008 A1 | 10/2013 | Bylahali et al. |
| 2013/0317928 A1 | 11/2013 | Laracey |
| 2015/0120666 A1 | 4/2015 | Otsuka |
| 2016/0086161 A1 | 3/2016 | Zhou et al. |
| 2016/0321661 A1 | 11/2016 | Hammond et al. |
| 2022/0374329 A1 * | 11/2022 | Savir ................... G06F 11/3457 |
| 2023/0098246 A1 * | 3/2023 | Simpson ............... G06F 1/1632 <br> 707/703 |

* cited by examiner

```
CREATE TABLE public.pos_events (
  id character varying(255) NOT NULL ENCODE lzo
  diskey
,
  timestamp timestamp without time zone ENCODE az64,
  service character varying(255) ENCODE lzo,
  log_type character varying(255) ENCODE lzo,
  location_id bigint ENCODE az64,
  menu_id bigint ENCODE az64,
  user_id bigint ENCODE az64,
  battery_level integer ENCODE az64,
  message character varying(512) ENCODE lzo,
  processing_time integer ENCODE az64,
  tablet_generated_id character varying(255) ENCODE lzo,
  tablet_id bigint ENCODE az64,
  wifi_ssid character varying(255) ENCODE lzo,
  wifi_channel integer ENCODE az64,
  wifi_rssi integer ENCODE az64,
  walker_connected boolean ENCODE raw,
  walker_tv character varying(45) ENCODE lzo,
  walker_sn character varying(45) ENCODE lzo,
  walker_tsv character varying(45) ENCODE lzo,
  walker_ksn character varying(45) ENCODE lzo,
  app_version character varying(255) ENCODE lzo,
  created_at timestamp without time zone ENCODE az64,
  updated_at timestamp without time zone ENCODE az64,
  server_pos_services_status character varying(65535) ENCODE lzo,
  gps_longitude real ENCODE raw,
  error_count integer ENCODE az64,
  server_cashless_status character varying(65535) ENCODE lzo,
  wifi_ip character varying(65535) ENCODE lzo,
  location_group_id bigint ENCODE az64,
  batch_quantity integer ENCODE az64,
  event_tablet_message character varying(65535) ENCODE lzo,
  email character varying(65535) ENCODE lzo,
  server_order_handler_status character varying(65535) ENCODE lzo,
  uid character varying(65535) ENCODE lzo,
  gps_latitude real ENCODE raw,
  uid_count integer ENCODE az64,
  event_type character varying(65535) ENCODE lzo,
  event_tablet_timestamp timestamp without time zone ENCODE az64,
  hrn character varying(65535) ENCODE lzo,
  xaction_mode character varying(65535) ENCODE lzo,
  processing_time_long bigint ENCODE az64,
  gps_latitude_float real ENCODE raw,
  gps_longitude_float real ENCODE raw,
  event_tablet_timestamp_string character varying(65535) ENCODE lzo,
  tablet.id bigint ENCODE az64,
  tablet.assetid character varying(65535) ENCODE lzo,
  uid_list_last_updated character varying(65535) ENCODE lzo,
  location.name character varying(65535) ENCODE lzo,
  location_group.id bigint ENCODE az64,
  menu.id bigint ENCODE az64,
  menu.name character varying(65535) ENCODE lzo,
  location.id bigint ENCODE az64,
  location_group.name character varying(65535) ENCODE lzo,
  location_group.timezone character varying(65535) ENCODE lzo,
  PRIMARY KEY (id)
) DISTSTYLE AUTO
SORTKEY
  (location.name);
```

FIG. 4

EDGE NETWORK MONITORING AND ADAPTATION SYSTEMS

CROSS-REFERENCE TO RELATED APPLICATIONS

The present application is being co-filed with U.S. application Ser. No. 18/139,185, titled Dual Network Synchronization Across Point-of-Sale Devices Located at an Event Environment; U.S. application Ser. No. 18/139,153, titled A Unified Controller System for Point-of-Sale Devices; and U.S. application Ser. No. 18/139,201, titled Dual Network Implemented Method of a Customer Relationship Management and Point of Sale Merchandising System for Patron Experience, the contents of which are incorporated by reference herein in their entirety.

FIELD

The technology described herein generally relates to dynamic network systems, more particularly to edge network monitoring and adaptation systems incorporating point-of-sale devices.

BACKGROUND

A point-of-sale ("POS") device, also known as a point-of-sale terminal or register, is an electronic system used in retail stores, restaurants, businesses, and at events to process transactions. POS devices typically comprise a combination of hardware and software that allows customers to purchase goods and services by swiping their credit or debit cards, using mobile payments, touchless payments, or paying in cash.

POS devices can be deployed as a part of a network system where transactional and other data can be transmitted from a POS device to a server or data repository, in many cases utilizing wireless communication techniques and protocols. In an event environment, POS devices deployed as a part of a local, or edge, network are an essential tool for enabling quick and efficient transaction processing, while also providing record keeping, inventory management, and data intake over the course of an event. In this context, events can include music festivals, art festivals, culture festivals, music venues, outdoor events, professional sporting events. In some instances, these events are in remote settings or settings in which internet connection (e.g. cellular, wireless) may suffer from service availability, intermittent connection, dropped packets, congestion, and interference to name a few. Further, in this setting POS devices can undergo increased hardware and software usage which can place heavy loads on the devices themselves as well as the network to which they are connected.

Accordingly, there is a need to enable the monitoring of POS devices within a network deployed in an environment that requires high volume transaction processing and robust metrics gathering to quickly identify issues that arise in a system under stress and to efficiently resolve those issues. As such, the technology described herein provides dynamic network monitoring and adaptability systems and methods that allows for the real-time diagnosis and repair of POS and network hardware and software.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

At a high level, embodiments of the technology described herein are generally directed towards monitoring hardware and/or software in a network, such as an edge network in an event environment, and to further identify and repair issues associated with the hardware and/or software in the network.

According to some embodiments, a system for monitoring and adapting an edge network in event environments is provided, the system comprising: a plurality of user devices at an event environment to capture input data and/or generate device data, the plurality of user devices connected to an edge network via one or more access points; a data lake to receive the input data and/or device data; and a network monitoring station to query the data lake and generate business intelligence to determine the presence of an issue associated with one or more of the plurality of users devices and/or the edge network. Further, the network monitoring station can trigger an adaptive action in response to determining the presence of an issue associated with one or more of the plurality of users devices and/or the edge network According to some further embodiments, a computer-implemented method for monitoring and adapting an edge network in event environment is provided, the method comprising: generating, by a plurality of user devices at an event environment in operable communication with an edge network, a data set corresponding to the plurality of user devices, the data set comprising input data and/or operation information associated with the plurality of user devices; loading the data set into a data lake; querying or mining, by a network monitoring station, the data lake; generating, by the network monitoring system, business intelligence associated with the plurality of user devices; and determining, based on the business intelligence, the presence of an issue associated with one or more of the plurality of users devices. Additionally, the method can include triggering an adaptive action in response to determining the presence of an issue associated with one or more of the plurality of user devices.

According to some even further embodiments, methods and systems for monitoring and adapting an edge network in event environment can generate business intelligence or metrics associated with any number of point-of-service devices (including hardware and/or software) located within different zones of an event environment, and/or associated with any aspect of the network (including hardware and/or software) in which they are deployed. In some instances, the business intelligence can be developed over time (continuously or in batch fashion) and provided to any number of third-applications or services Additional objects, advantages, and novel features of the technology will be set forth in part in the description that follows, and in part will become apparent to those skilled in the art upon examination of the following, or can be learned by practice of the invention.

BRIEF DESCRIPTION OF THE DRAWINGS

Aspects of the present disclosure can be better understood with reference to the following drawings. The components in the drawings are not necessarily to scale, with emphasis instead being placed upon clearly illustrating the principles of the disclosure. Aspects of the technology presented herein are described in detail below with reference to the accompanying drawing figures, wherein:

FIG. 4 illustrates example data elements monitored and/or captured in an edge network monitoring and adaptation system, in accordance with some aspects of the technology described herein;

DETAILED DESCRIPTION

Figure 1:
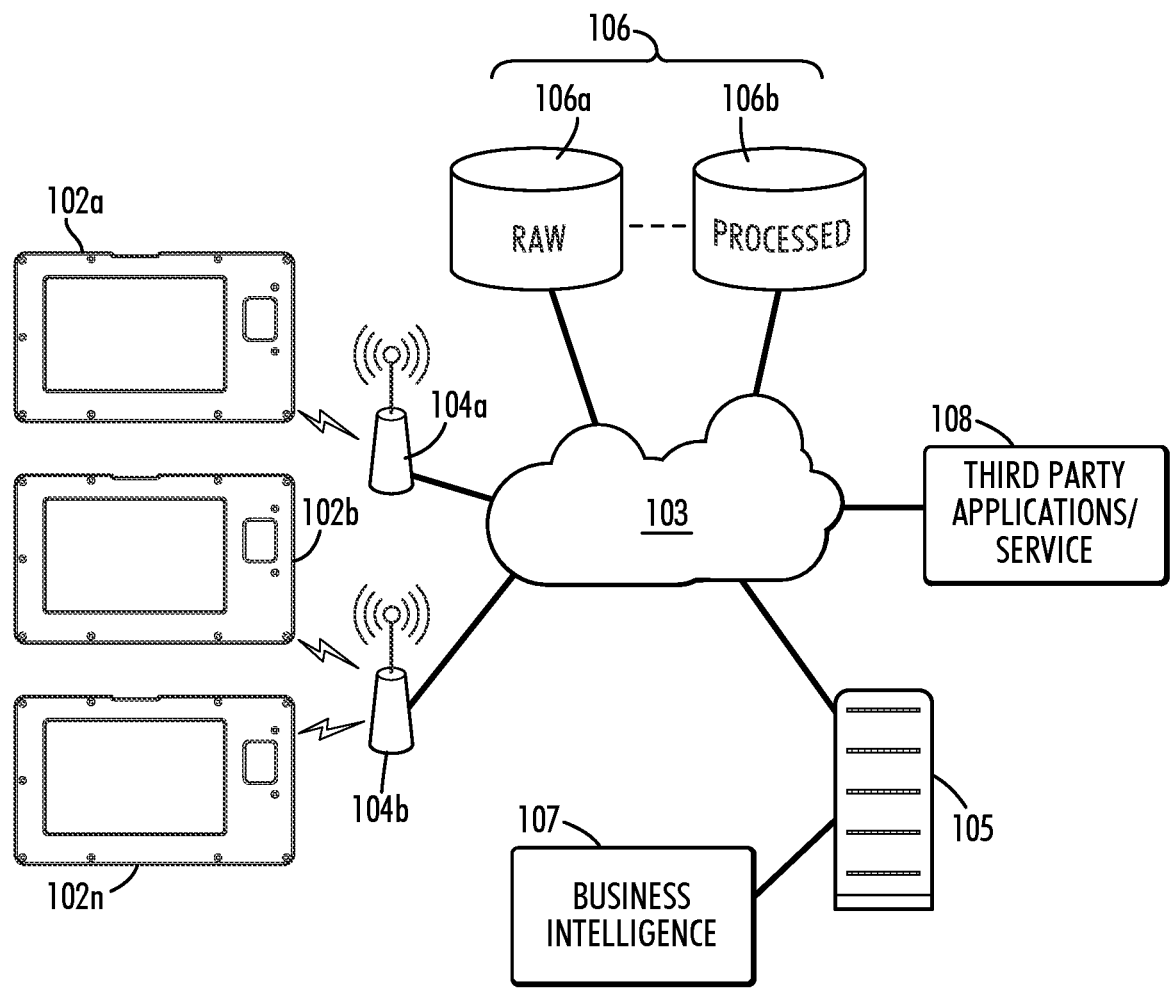
FIG. 1 shows a schematic illustrating an edge network monitoring and adaptation system, in accordance with some aspects of the technology described herein.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps disclosed herein unless and except when the order of individual steps is explicitly described.

Accordingly, embodiments described herein can be understood more readily by reference to the following detailed description, examples, and figures. Elements, apparatus, and methods described herein, however, are not limited to the specific embodiments presented in the detailed description, examples, and figures. It should be recognized that the exemplary embodiments herein are merely illustrative of the principles of the invention. Numerous modifications and adaptations will be readily apparent to those of skill in the art without departing from the spirit and scope of the invention.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Described herein are dynamic network systems, more specifically network monitoring and adaptation systems and methods, that, in some instances can incorporate a plurality of point-of-sale (POS) devices or systems, or other user devices, configured to collect one or more data elements or data inputs. In some embodiments, systems and methods described herein are configured to monitor a network (e.g. hardware and/or software) through an edge network monitoring device or system, and further to take an action based on the one or more data inputs or data elements associated with the network, which can be collected over a period and stored. In some instances, the data elements can monitored and/or collected over a determined period or be stored as a time series of data elements.

According to some aspects, the present technology is directed towards business intelligence (BI) software that can be deployed across a plurality of point-of-sale devices (e.g. tablet computers or other use devices) in an event environment or location, and a network monitoring device or system in the event environment can monitor the status of various zones within the event environment (e.g. bars, restaurants, shops) and can perform a variety of functions, such as diagnosing network issues (e.g. RSSI issues), power issues, hardware and/or software failures (e.g. swipe, dip, NFC failures at a POS device), and can further provide business intelligence into monitored zones, for example if sales are high in a zone resources can be shifted to adapt the network. Further, systems and methods described herein can enable the diagnosis of failures or the need for additional support for cellular or other wireless resources. In one example, the business intelligence can identify areas of greater spend and the optimal placement of services (e.g. vendors) in an event environment.

Accordingly, in some aspects, the technology described herein relates to edge network monitoring and adaptation systems operating in an event environment. In some aspects, embodiments of the technology described herein are directed to an environment based evolving edge network, which may further be a part of a larger network system. In the context of the present technology, edge networking is a distributed computing model that can bring computation and data storage closer to request or access points to provide numerous benefits such as real-time data processing, data visualization, analytics, IoT device management, improved data caching, filtering, buffering, transfer, and optimization, among others. In some further aspects, the present technology can provide and leverage business intelligence through collected and accumulated data through a plurality of user devices (such as POS devices) or other hardware and/or software. In one example, the present technology can provide and leverage business intelligence through accumulated data elements via POS devices to predict, diagnose, and repair POS hardware and/or software issues as well as network issues and peripheral hardware and/or software in an event environment.

In some even further aspects, the present technology is directed to collecting POS data (e.g. hardware, software, and/or connectivity and network data) in an event environment via one or more POS devices and storing the data (e.g. data elements, data set) in one or more database systems and/or pushing the data to a data lake where the data can be stored as a raw data set or processed and stored as a processed data set. A data set (e.g. a raw or processed data set) can subsequently be leveraged and presented on one or more edge network monitoring devices, for instance as a business intelligence (BI) service dashboard or an interface for data object storage. In combination with the one or more POS devices and/or edge network monitoring devices, the edge network system can be configured to diagnose, fix, and adapt the network or a portion of the network, for example push power to connected devices when failing, reassign channels, perform active recovery of the network, and predict network failures or other hardware and/or software issues.

The present technology may be embodied as, among other things, a system, method, or computer-product. Accordingly, embodiments may take the form of a hardware embodiment, a software embodiment, or an embodiment combining software and hardware. In one embodiment, the present invention takes the form of a computer program product that includes computer useable instructions embodied on one or more computer readable media and executed by one or more processors.

Computer readable media includes both volatile and non-volatile media, removable and non-removable media, and media readable by a database, a switch, and various other network devices. Network switches, routers, access points, and related components in some instances act as a means of communication within the scope of the technology. By way of example, computer readable media comprise computer storage media and communications media.

Computer storage media or machine readable media can include media implemented in any method or technology for storing and/or transmitting information or data. Examples of such information include computer-useable instructions, data elements, data structures, programs and program modules, and other data representations.

Communications media generally store computer useable or readable instructions, including data structures and program modules in a modulated data signal. A modulated data signal in some instances can be understood to be a propagated signal that has one or more of its characteristics set or changed to encode information in the signal. Communications media include any information-delivery media. By way of example and not limitation, communications media include wired media, such as a wired network or direct-wired connection, and wireless media such as radio, cellular, spread-spectrum, and other wireless media technologies. Combinations of the above are included with the scope of computer readable media and communications media.

In some aspects, the technology described herein relates to a one or more point-of-sale systems or devices operating in an event environment. In some instances, point-of-sale devices can be deployed or implemented in an edge network in an event environment. A point-of-sale system may include a computing device such as a mobile phone, tablet computer, or other computing device that is capable of executing software, such as an operating system equipped with enough memory to store instructions for executing a customer relationship management application ("CRM"). Further, an application may include vendor store fronts, process sales transactions, and connect to a business intelligence suite. Example computing devices including processing circuitry, memory circuitry, and communications circuitry, among other components.

According to embodiments of the present technology, a system for monitoring and adapting an edge network in event environments is provided. The system can include a plurality of user devices (e.g. point-of-sales devices) to capture input data (e.g. transactional data, event data) and/or generate device data (e.g. operational data about the device). The user devices can be employed within a communications network, and in some instances, the user devices can be connected to and communicate with the network via one or more access points. As such, the system can further generate data associated with the communications network itself or connected access points, servers, and/or databases. Such data can include operational information associated with the communications network and/or connected hardware, such as access points. The system can include one or more data repositories or warehouses, such as a data lake to receive and store the input data and/or device data. The data lake enables the storage of structured and/or unstructured raw data and/or processed data at any scale and can be leveraged for analytics or further for machine learning to guide better system decisions. Input data and/or device data can be pushed, pulled, or otherwise transmitted to the data lake in a batch process or in a continuous stream (i.e. continuous data stream). In some instances, the data lake can store and/process data across multiple buckets. For example, the data lake stores the input data and/or device data in raw form in a first bucket and subsequently the data lake processes the data in raw form and stores the processed data in a second bucket.

The system can include a network monitoring station to query or mine the data lake and generate business intelligence about the system and connected devices to determine the presence of an issue associated with one or more of the plurality of user devices and/or the edge network (e.g. issues with one or more communication components or access points). Business intelligence refers any number of different types of analytics including dashboards and visualizations, dig data processing, real-time system analytics. Business intelligence can be generated or developed based on current and historical data and further machine learning can be performed on any portion of data stored in the data lake to, for example, to build models to forecast system performance or outcomes or to further determine a range of prescribed actions to achieve optimal system operation or results.

In response to determining the presence of an issue associated with one or more of the plurality of users devices and/or the edge network, the network monitoring station can trigger an adaptive action for one or more of the plurality of users devices, or any portion of the communications network. In some instances, the adaptive action can be at least one of pushing power to a user device (e.g. connectivity power), reassigning a communication channel of a user device connected to an access point, and/or repairing a communication channel within the network. In some other instances, the adaptive action comprises repairing software running on one or more of the plurality of user devices and/or within the edge network (e.g. communications or connectivity software, firmware, etc.). In some further instances, the adaptive action comprises providing an indication to replace at least a portion of hardware of a user device and/or relocate a user device (e.g. to a different location in an event area or within the communications network). In some even further instances, the adaptive action comprises providing a forecast indication of a network failure somewhere in the system (e.g. including user devices and/or the communications network, software, firmware, and/or hardware).

Referring now to the drawings, and initially to FIG. 1, an example edge network monitoring and adaptation system 100 is depicted in accordance with various embodiments of the present technology. Edge network monitoring and adaptation system 100 can include at least one user device 102a, 102b, 102n, for example a point-of-sale device, in communication with a network 103. A user device 102a, 102b, 102n can be connected to network 103 via one or more access points 104a, 104b (i.e. network access points). Any number of access points 104 can be connected to network 103, for instance based on the number of user devices 102a, 102b, 102n deployed in the system. It will be appreciated that an access point 104a, 104b may be implemented as, for example, a router, base station microcell, and/or macrocell, and configured to detect signals from user devices 102a, 102b, 102n and transmit one or more signals over the network 103. Edge network monitoring and adaptation system 100 can further be connected to data lake 106, which can be implemented as a LAN, WAN, or cloud-based setup. Data lake 106 can ingest data received from user devices 102a, 102b, 102n (e.g. a plurality of data elements). Data ingested by data lake 106 can initially be stored in a raw data bucket 106a in a raw data format, which can include structured, semi-structured, and unstructured data objects. Data stored in raw data bucket 106a can be processed or otherwise transformed and stored in a processed data bucket 106b. Although not depicted, data from the processed data bucket 106b can further be enriched by blending the data with other data sets from other sources and stored in a curated data bucket. Data lake 106 can be connected to network monitoring station 105 via network 103. It will be appreciated that network monitoring station or device 105 can be implemented locally, remotely, or on the cloud. Network monitoring station can query or mine data lake 106 for relevant data elements corresponding to user devices 102a, 102b, 102n and/or input and/or transactional data acquired by user devices 102a, 102b, 102n, or network data. Based on the queried and/or mined data, network monitoring station 105 can monitor the network and/or connected devices, perform adaptive actions on the network and/or connected devices, or provide business intelligence about the network and/or connected devices. In some aspects, network monitoring station 105 can run a business intelligence application or suite 107 that can process and present to a user analytics about the network and/or connected devices, or further about the data collected by user devices 102a, 102b, 102n (e.g. event data). Additionally, network monitoring station 105 can provide data or business intelligence to a third-party application or service 108. Further, it will be appreciated that network monitoring station 105 can run an interface for interaction with data lake 106.

Figure 2A:
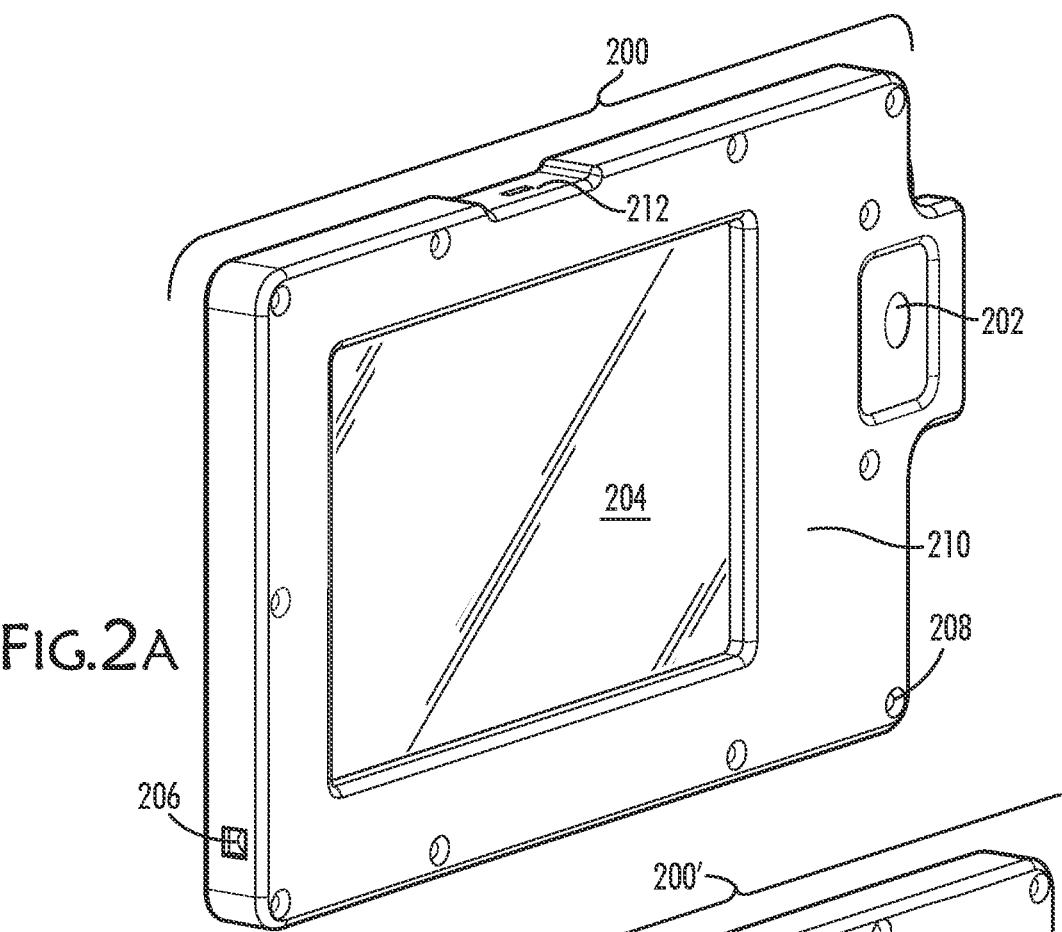
FIG. 2A illustrates an example point-of-sale system, in accordance with some aspects of the technology described herein.
Figure 2B:
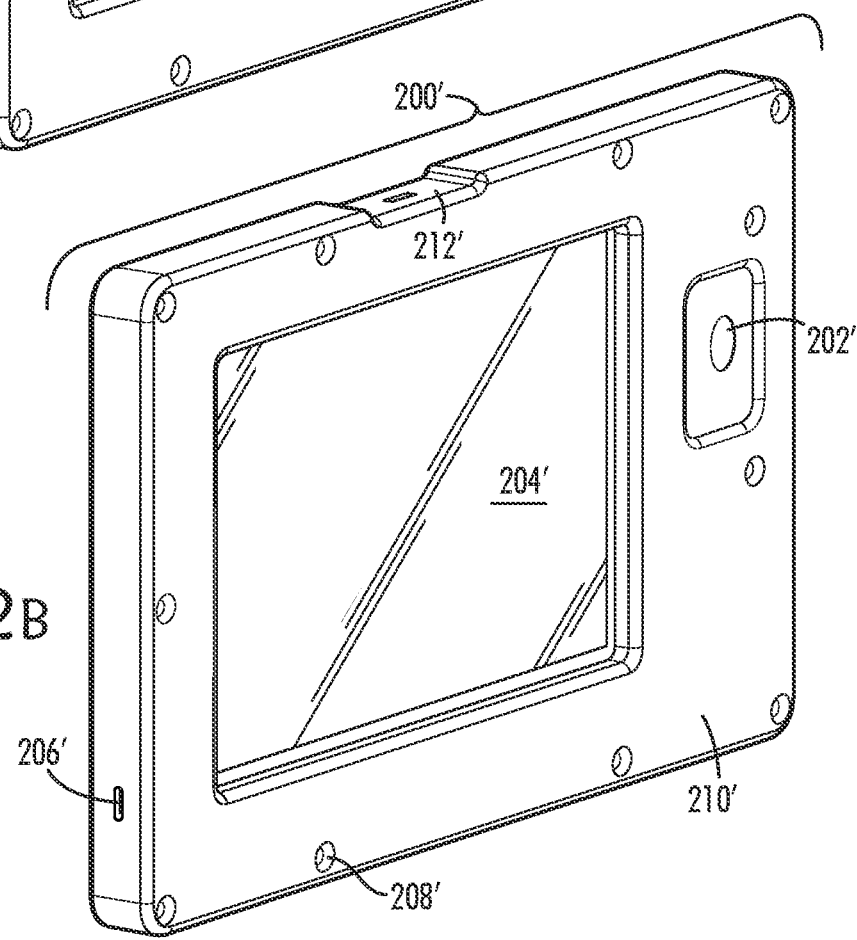
FIG. 2B illustrates an example point-of-sale system, in accordance with some aspects of the technology described herein.

Turning to FIGS. 2A and 2B, according to some aspects a point-of-sale system can include a tablet computing device encased in a shell. The shell may be a polymeric shell that benefits from the same aspects as a weather resistant shell. Further, the shell may be combined with other features such as gaskets, seals, baffles, windows, ports, rigidity material, corner protectors, cable traces, and the life to accommodate the tablet computing device and peripherals. A weather resistant shell is designed with a rubber inner seal around entryways to provide international standard EN 60529 and IEC 60529 IP rating 55 and above. The weather resistant shell may also comprise an adhesive to help seal, or a lubricant applied to an inner rubber seal for preservation and longevity of the weather resistance. Further, the weather resistant shell may be comprised of a polymeric material, and may also be embedded with rubber on the edges or metal may be introduced within the polymeric shell for rigidity. Weather resistance also includes resistance to dust, through baffles and the rubber inner seal. Such resistance to dust also allows for heat dissipation through the baffles. Further, the weather resistant shell may be made out of colors that display higher reflection of unwanted solar radiation. The weather resistant shell benefits from being lightweight, durable, insulation, and cost-effectiveness.

Referring to FIG. 2A, an illustration of an example point-of-sale system or device 200 as disclosed herein is shown. In one aspect, point-of-sale system 200 is configured with a weather resistant shell 210. The weather resistant shell can be rated at least IP 55 for water and dust ingress. The weather resistant shell 210 is typically comprised of two pieces, a top piece and a bottom piece, and void regions defined within the interior for accepting the computing device and peripherals. Further, the weather resistant shell 210 is held together by fasteners 208, which may compress an inner seal to provide at least some of the weather resistant aspects.

As depicted in FIG. 2A, the display 204 is the display of the computing device, and it may further have additional shielding or a glare reducing layer applied. The payment device 202 is offset and encased within the weather resistant shell, and a portion is external to allow for insertion of an EMV chip card, or a swipe card transaction. An additional front portion is unshielded by the weather resistant shell to allow for NFC transactions or to allow radio frequency transmission.

In one aspect, the power port 206 is a barrel port for receiving power to the power supply. In other aspects, the power port may be a USB-C connection that may also transfer data. Further, there may be a radio transmission window 212 of non-radio frequency interfering material, such as a thin plastic shroud, that allows for an antenna to be located beneath, or for NFC communications.

Referring to FIG. 2B, an illustration of an example point-of-sale system or device 200' as disclosed herein is shown. In one aspect, the point-of-sale system 200' is configured with a weather resistant shell 210'. Wherein the weather resistant shell is rated at least IP 55 for water and dust ingress. The weather resistant shell 210' is typically comprised of two pieces, a top piece and a bottom piece, and void regions defined within the interior for accepting the computing device and peripherals. Further, the weather resistant shell 210' is held together by fasteners 108', which may compress an inner seal to provide the weather resistant aspects.

As depicted in FIG. 2, the display 204' is the display of the computing device, and it may further have additional shielding or a glare reducing layer applied. The payment device 202' is encased within the weather resistant shell. An additional front portion is unshielded by the weather resistant shell to allow for NFC transactions or to allow radio frequency transmission.

In one aspect, the power port 206' may be a USB-C connection that may also transfer data. Further, there may be a radio transmission window 212 of non-radio frequency interfering material, such as a thin plastic shroud, that allows for an antenna to be located beneath, or for NFC communications.

As depicted, a point-of-sale device (e.g. 200 of FIG. 2A and 200' of FIG. 2B) can include a display, which can be configured in some instances to receive input data from a user which can be captured by the device and subsequently stored (such as in a local cache) and/or transmitted over a network (e.g. wireless, wired, or a combination) to another device/system, storage repository, or application. Point-of-sale device can further incorporate a payment device (also referred to herein as a transaction device) or card reader and configured to allow for insertion and reading of an EMV chip card, or a swipe card transaction. A transaction device may include a chip card reader, a swipe card reader, NFC reader, and Bluetooth or other wireless support for reading a payment vehicle (e.g. credit card, RFID, NFC tags). As such a transaction device in operable communication with a point-of-sale device can also be understood to receive input data (e.g. in the for of transaction data, or event data), that can be captured by the device and stored and/or transmitted over a network (e.g. wireless, wired, or a combination) to another device/system, storage repository, or application. In various aspects, point-of-sale devices are equipped with one or more antennas and/or wireless modules and/or cellular transmission modules that enable radio frequency or wireless transmission over a network as described herein or between user devices. Further, as described in reference to FIGS. 2A and 2B, a point-of-sale device can further include a power port which can receive power from the power supply, or further power port may be utilized for data transfer, to either receive and/or transmit data (such as one or more data elements collected or generated by the point-of-service system.

Figure 3:
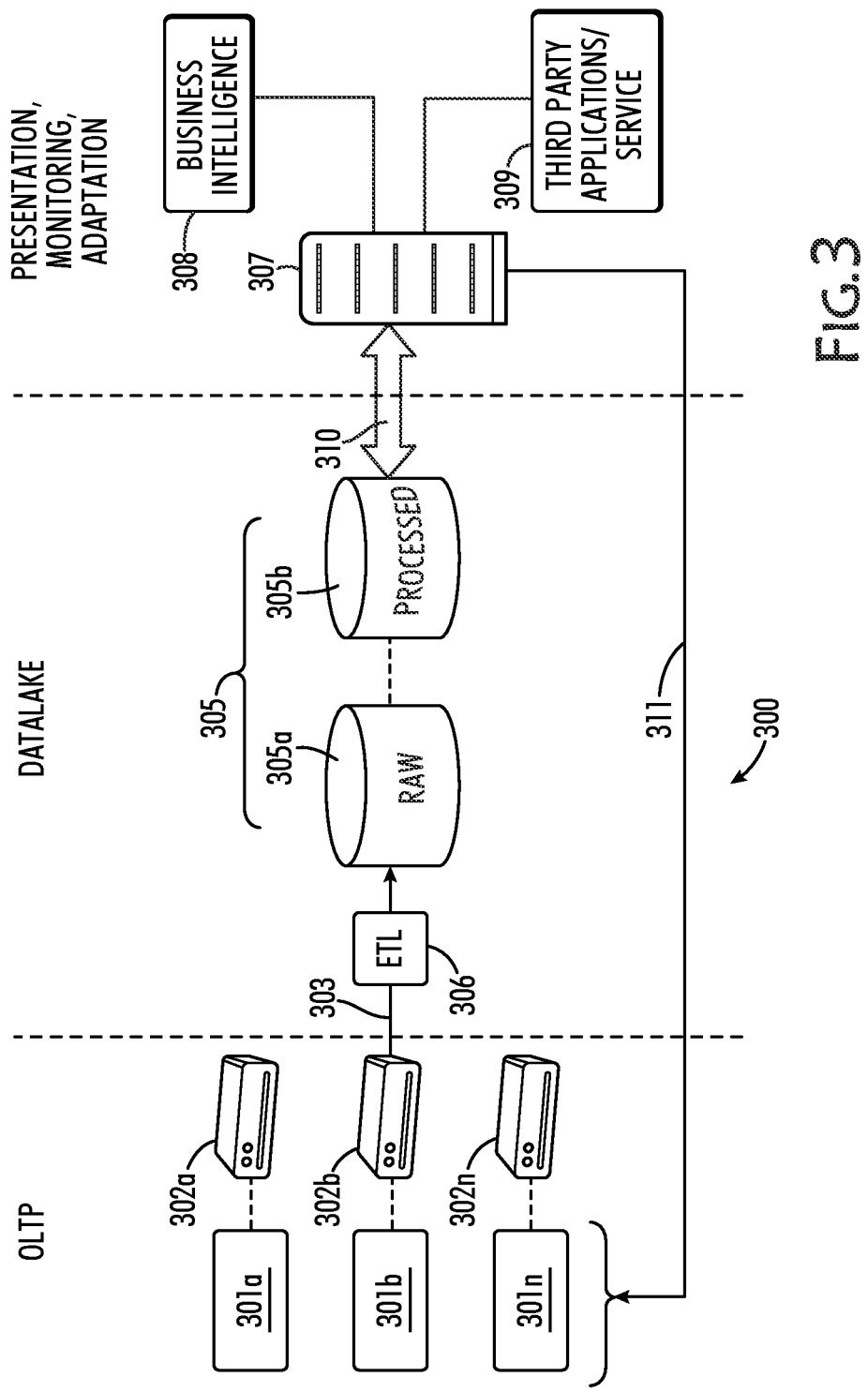
FIG. 3 illustrates an example flow diagram showing various aspects of an edge network monitoring and adaptation system, in accordance with some aspects of the technology described herein.

Turning now to FIG. 3, an example edge network monitoring system architecture and data flow 300 is illustrated, in accordance with some aspects of the present technology. As will be appreciated, the edge network monitoring system architecture and dataflow 300 as depicted is a conceptual diagram and is not meant to show all network and system boundaries. It should be understood that this and other arrangements described herein are set forth as examples. Other arrangements and elements (e.g. machines, interfaces, functions, orders, and groupings of functions) can be used in addition to or instead of those shown, and some elements or components are omitted for the sake of clarity. Further, many of the elements and components described herein are functional entities that can be implemented as discrete or distributed components and/or functions or in conjunction with other components, and in any suitable combination and location. Various functions described herein as being performed by one or more entities can be carried out by hardware, firmware, and/or software. For instance, some functions can be carried out by a processor executing instructions stored in memory.

With reference to FIG. 3, an edge network monitoring and adaptation system can in some aspects be simplified into an online transaction processing and/or data collection phase, a datalake or storage phase, and a network analytics presentation, monitoring and/or adaptation phase. A plurality of user devices (e.g. point-of-service) 301a, 301b, 301n can receive input data, for example, in the form of user input data and/or transaction data (e.g. payment data) from one or more transaction events. The plurality of user devices 301a, 301b, 301n can further generate data about the device itself, for example device logs or connectivity data. Collectively, the data can be referred to as accumulated data or source data comprising a plurality of data elements. In some instances user devices 301a, 301b, 301n can store accumulated data in a local temporary storage or cache 302a, 302b, 302n, or in one or more local connected database(s), not shown, such as a relational database. An accumulated data set can subsequently or immediately placed into a data stream 303 for transmission to data lake 305. The accumulated data set can be transmitted or otherwise communicated to data lake 305 in one or more batch processes (e.g. from local data storage) or in a streaming process. A data extract, transform, and load (ETL) service or process 306 can deliver batch and/or streaming data to data lake 305. In some instances, ETL process 306 can collect the accumulated data set into one or more files on an object storage infrastructure, such as a raw data bucket 305a. Data stored in raw data bucket 305a can be processed or otherwise transformed and subsequently stored in a processed data bucket 305b. A network monitoring station 307 can query, mine, or otherwise interact with data lake 305 (e.g. via data stream 310) for data elements corresponding to user devices 302a, 302b, 302n, and/or network data elements. In this way, network monitoring station 307 can monitor data associated with the system (e.g. edge network monitoring and adaptation system 100 of FIG. 1). As will be appreciated, system and/or network data can be continuously transmitted and monitored in real-time and perform adaptive actions on the network and/or connected devices, or generate and/or provide business intelligence about the network and/or connected devices in real-time. In some aspects, network monitoring station 307 can run a business intelligence application or suite 308 that can process and present to a user analytics about the network and/or connected devices, or further about the data collected by user devices 302a, 302b, 302n (e.g. event data). Additionally, network monitoring station 307 can provide data or business intelligence to a third-party application or service 309. Further, network monitoring station 307 can run an interface for interaction with data lake 305.

According to some further aspects, network monitoring station 307 in conjunction with data lake 305 can generate business intelligence about the system and/or connected devices and/or software running on the devices, for instance to diagnose and/or repair user device (e.g. a point-of-service device) hardware and/or software or network issues. In some instances, network monitoring station 307 the status (hardware and/or software) of a user device at a given location, can diagnose network and/or connectivity issues (e.g. RSSI, cellular resources), power issues, hardware failures (e.g. swipe/dip readers, NFC elements). Further, the system can repair or otherwise adapt the network and connected devices. Network monitoring station 307 can automatically repair hardware, software, and/or network issues, via communication stream 311, or provide analytics to a user via business intelligence application 308 such that the user can cause the system to take a corrective action or manually repair a broken portion of the system (e.g. replacing a user device hardware and/or software). In some instances, corrective actions can include, but are not limited to, pushing power to a failing user device, reassigning channels being used by the user devices, provide active recovery of the network and/or connected devices, or further predict hardware and/or software, and/or network failure. In some further aspects, the generated business intelligence can inform a user of transactional data associated with an event environment, or specific locations within an event environment, and for example inform a user and/or the system as to optimal placements of user devices within the network.

Turning briefly to FIG. 4, example data elements monitored and/or captured in the edge network monitoring and adaptation system described herein are illustrated, in accordance with some aspects of the technology described herein. As will be appreciated, FIG. 4 illustrates example data elements monitored and/or collected or otherwise captured by the system, or one or more devices within the system, and subsequently transmitted to a data lake. As will be appreciated, data elements illustrated in FIG. 4 generally relate to location and operational data associated with a given user device (e.g. point-of service device). Other example data elements that can be monitored and/or collected or otherwise captured by the system include any event data, transactional data, user data, customer data, and sales data, among others.

Having described various aspects of systems for monitoring and adapting an edge network, for example in event environments, example methods are now described for implementing the forgoing edge network monitoring and adaptation system methods described herein can be carried out by user action, computing processes, digital conversion processes, or a combination comprising the foregoing. In some instances, methods described herein comprise a computing process that can be performed using any combination of hardware, firmware, and/or software. For instance, a processor executing instructions stored in memory can carry out various functions. The methods can also be embodied as computer-usable instructions stored on computer storage media. The methods can be provided by a standalone application, a service or hosted service (standalone or in combination with another hosted service), or a plug-in to another product, to name a few.

At a first block, a plurality of user devices at an event environment in operable communication with an edge network can generate a data set corresponding to the plurality of user devices, the data set comprising input data and/or operation information associated with the plurality of user devices. At a second block, the data set (or a portion of the data set) can be loaded or transmitted into a data lake, either as a set of batch transactions or as a continuous stream. In some instances, the data is provided to the data lake via an ETL process. The data lake can subsequently store raw data (e.g. as structured, unstructured, or semi-structured data). The raw data can be stored in a first bucket in the data lake. Subsequently the data lake can process or at least a portion of the raw data to generate a processed data set. The processed data set can be stored in a second bucket in the data lake.

At a third block, a network monitoring station can query or mine the data lake, for instance over a period of time, to subsequently at a fourth block generate business intelligence associated with the plurality of user devices. At a fifth block, the system, or a component in the system (e.g. a network monitoring station), can determine the presence of an issue associated with one or more of the plurality of users devices based on at least the generated business intelligence. In some aspects, other data about the system and or connected network devices and/or software may be generated and loaded into the data lake. For instance, one or more access points in the edge network can generate an additional data set comprising operational information associated with the one or more access points and subsequently the additional data set can be loaded into the data lake. Additionally, business intelligence may be generated based on multiple data sets, such that the business intelligence is associated with the plurality of user devices and the one or more access points.

At a sixth block, an adaptive action can be triggered in response to determining the presence of an issue associated with one or more of the plurality of user devices. In some instances, the adaptive action comprises at least one of pushing power to a user device, reassigning a communication channel of a user device, and/or repairing a communication channel within the network. In some other instances, the adaptive action comprises repairing software running on one or more of the plurality of users devices. In some other instances, the adaptive action comprises providing an indication to replace at least a portion of hardware of a user device and/or relocate a user device. In some even other instances, the adaptive action comprises providing a forecast indication of a network failure.

Figure 6:
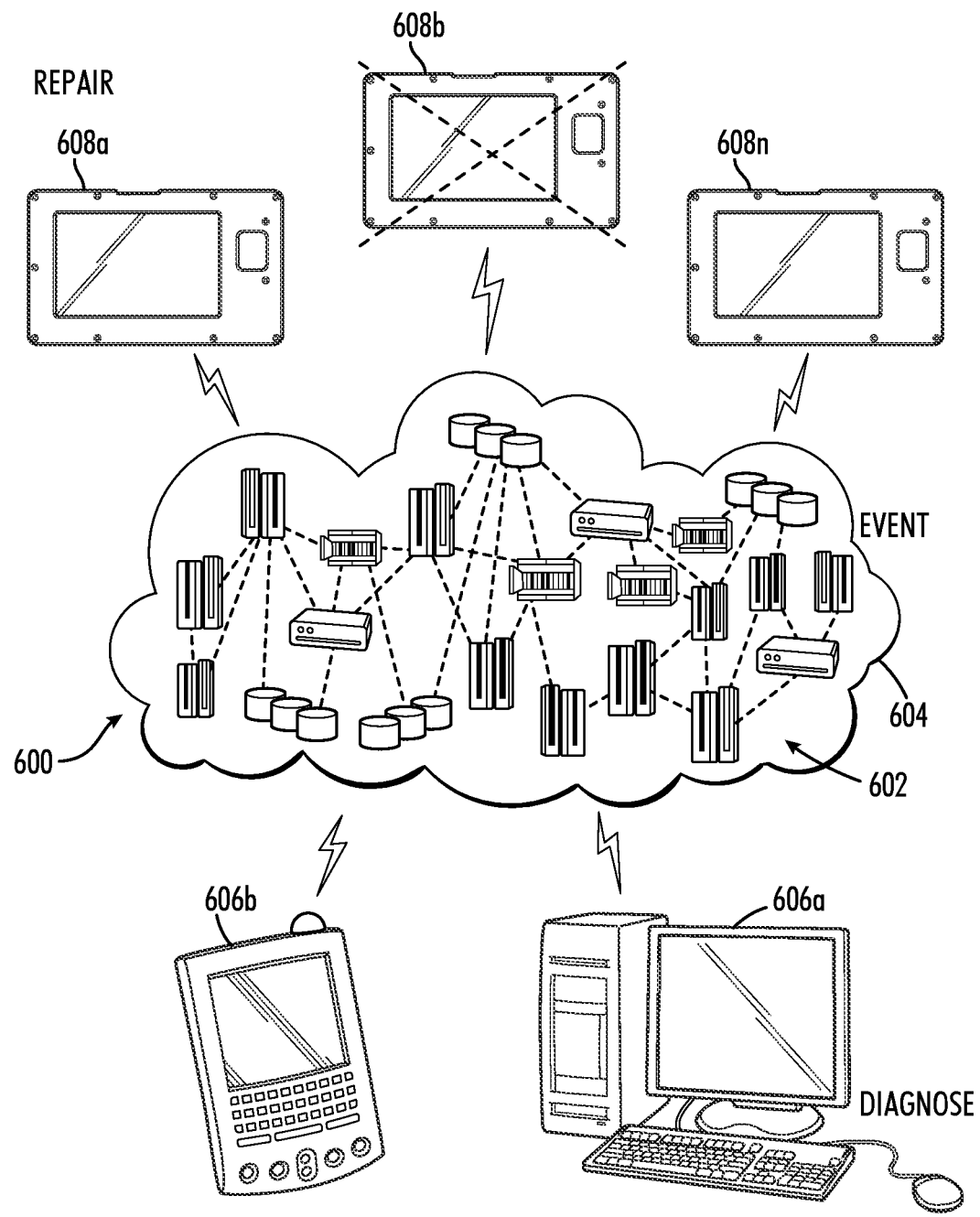
FIG. 6 illustrates an example network monitoring and adaptation system, in accordance with some aspects of the technology described herein.

Referring to FIG. 6, an example network monitoring and adaptation system, in accordance with some aspects of the technology described herein is illustrated and designated generally as network monitoring and adaptation system 600. In some aspects, network monitoring and adaptation system 600 is referred to in order to further illustrate the various systems and methods described herein. According to some aspects, edge network monitoring and adaptation system 600 can include one or more user devices 608*a*, 608*b*, 608*n*, for example a point-of sale-device in communication with network 604. In some aspects network 604 (e.g. communications network) can incorporate a plurality of interconnected hardware and/or software components 604, and in some aspects as a plurality of nodes in a network 604. In some instances, the components can comprise a plurality of interconnected storage systems or devices, access points, servers, machine learning components, etc. In some further instances, interconnected components can include one or more data lakes or one or more buckets within a data lake. It will be appreciated that network 604 can be implemented in any form required, such as LAN, WAN, or cloud-based. Any of the connected components 602 of network 604 (including both hardware and/or software) can be monitored by a network monitoring station and/or device 606*a*, 606*b*, which can implemented as a single station or device or a plurality of stations 606*a* and/or devices 606*b*. As described herein, network 604 may be implemented in an event environment as an edge network as a part of an edge network monitoring and adaptation system 600. Network monitoring station and/or devices 606*a*, 606*b* can monitor connected components 602 and additionally user devices 608*a*, 608*b*, 608*n*. Network monitoring station and/or devices 606*a*, 606*b* can query or mine a data lake associated with network 604, for instance among interconnected components 602 for data elements corresponding to user devices 608*a*, 608*b*, 608*n* and/or input and/or transactional data acquired by user devices 608*a*, 608*b*, 608*n*, or network 604 data or interconnected components 602 data. Based on the queried and/or mined data, network monitoring station and/devices 606*a*, 606*b* can monitor the network and/or connected devices, perform adaptive actions on the network and/or connected devices, or provide business intelligence about the network and/or connected devices. For instance, if user device 608*b* encounters an issue, such as connectivity issues, hardware and/or software issues, network monitoring station and/ devices 606*a*, 606*b* can diagnose one or more issues with respect to the user device 608*b*, and based on the diagnosis and other business intelligence about the system, can repair the issue(s) with respect to the identified user device 608*b*.

Figure 5:
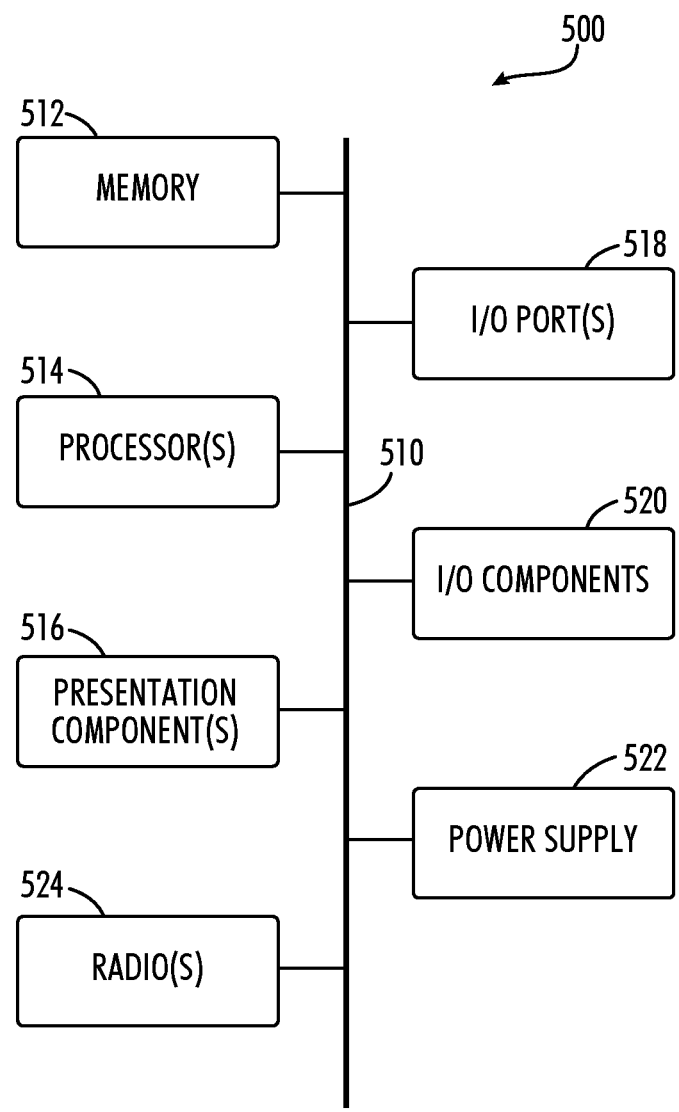
FIG. 5 is a block diagram of an example computing environment and/or device architecture in which some implementations of the present technology may be employed.

FIG. 5 provides an illustrative operating environment for implementing embodiments of the present invention and designated generally as computing device 500. Computing device 500 is merely one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention can be described in the general context of computer code or machine-useable instructions, including computer-executable instructions such as program modules, being executed by a computer or other machine (virtual or otherwise), such as a smartphone or other handheld device. Generally, program modules, or engines, including routines, programs, objects, components, data structures etc., refer to code that perform particular tasks or implement particular abstract data types. Embodiments of the invention can be practiced in a variety of system configurations, including hand-held devices, consumer electronics, general-purpose computers, more specialized computing devices, etc. Embodiments of the invention can also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. In some embodiments, devices described herein utilize wired and rechargeable batteries and power supplies. Bus 510 represents what can be one or more busses (such as an address bus, data bus or combination thereof). Although the various blocks of FIG. 5 are shown with clearly delineated lines for the sake of clarity, in reality, such delineations are not so clear and these lines can overlap. For example, one can consider a presentation component such as a display device to be an I/O component as well. Also, processors generally have memory in the form of cache. It is recognized that such is the nature of the art, and reiterate that the diagram of FIG. 5 is merely illustrative of an example computing device that can be used in connection with one or more embodiments of the present disclosure. Distinction is not made between such categories as "workstation," "server," "laptop," "hand-held device," etc., as all are contemplated within the scope of FIG. 5 and reference to "computing device" or "user device."

Computing device 500 typically includes a variety of computer-readable media. Computer-readable media can be any available media that can be accessed by computing device 500, and includes both volatile and non-volatile media, removable and non-removable media. By way of example, and not limitation, computer-readable media can comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner at to encode information in the signal. By way of example, and not limitation, communication media includes wired media such as a wired network or direct-wired connection, and wireless media such as acoustic, RF, infrared, NFC, Bluetooth, cellular, and other wireless media. Combinations of any of the above should also be included within the scope of computer-readable media.

Memory 512 includes computer storage media in the form of volatile and/or non-volatile memory. As depicted, memory 512 includes instructions 524, when executed by processor(s) 1014 are configured to cause the computing device to perform any of the operations described herein, in reference to the above discussed figures, or to implement any program modules described herein. The memory can be removable, non-removable, or a combination thereof. Illustrative hardware devices include solid-state memory, hard drives, optical-disc drives, etc. Computing device 500 includes one or more processors that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which can be built in. Illustrative components include a microphone, joystick, touch screen, presentation component, satellite dish, scanner, printer, wireless device, battery, etc.

Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims.

The invention claimed is:

1. A system for monitoring and adapting an edge network in event environments, the system comprising:
   a plurality of user devices at an event environment to capture input data and/or generate device data, the plurality of user devices connected to an edge network via one or more access points;
   a data lake to receive and store the input data and/or device data; and
   a network monitoring station to query the data lake and generate business intelligence to determine the presence of an issue associated with one or more of the plurality of users devices and/or the edge network.

2. The system of claim 1, wherein the network monitoring station triggers an adaptive action in response to determining the presence of an issue associated with one or more of the plurality of users devices and/or the edge network.

3. The system of claim 2, wherein the adaptive action comprises at least one of pushing power to a user device, reassigning a communication channel of a user device, and/or repairing a communication channel within the network.

4. The system of claim 2, wherein the adaptive action comprises repairing software and/or firmware running on one or more of the plurality of user devices and/or the edge network.

5. The system of claim 2, wherein the adaptive action comprises providing an indication to replace at least a portion of hardware of a user device and/or relocate a user device.

6. The system of claim 2, wherein the adaptive action comprises providing a forecast indication of a network failure.

7. The system of claim 1, wherein the plurality of user devices push input data and/or device data to the data lake in a continuous stream.

8. The system of claim 1, wherein the data lake stores the input data and/or device data in raw form in a first bucket.

9. The system of claim 8, wherein the data lake processes the data in raw form and stores the processed data in a second bucket.

10. The system of claim 1, wherein the business intelligence is generated in real-time.

11. A computer-implemented method for monitoring and adapting an edge network in event environment, the method comprising:
- generating, by a plurality of user devices at an event environment in operable communication with an edge network, a data set corresponding to the plurality of user devices, the data set comprising input data and/or operation information associated with the plurality of user devices;
- loading the data set into a data lake;
- querying, by a network monitoring station, the data lake;
- generating, by the network monitoring system, business intelligence associated with the plurality of user devices; and
- determining, based on the business intelligence, the presence of an issue associated with one or more of the plurality of users devices.

12. The method of claim 11, further comprising: generating, by one or more access points in the edge network, an additional data set comprising operational information associated with the one or more access points; loading the additional data set into the data lake; and generating business intelligence associated with the plurality of user devices and the one or more access points.

13. The method of claim 11, further comprising triggering an adaptive action in response to determining the presence of an issue associated with one or more of the plurality of user devices.

14. The method of claim 13, wherein the adaptive action comprises at least one of pushing power to a user device, reassigning a communication channel of a user device, and/or repairing a communication channel within the network.

15. The method of claim 13, wherein the adaptive action comprises repairing software running on one or more of the plurality of users devices.

16. The method of claim 13, wherein the adaptive action comprises providing an indication to replace at least a portion of hardware of a user device and/or relocate a user device.

17. The method of claim 13, wherein the adaptive action comprises providing a forecast indication of a network failure.

18. The method of claim 11, wherein the loading the data set into the data lake comprises transmitting the data set to the data lake in a continuous stream.

19. The method of claim 11, wherein the data lake stores the data set in raw form in a first bucket, the method further comprising: processing the data set in raw form to generate a processed data set; and storing the processed data set in a second bucket.

20. The method of claim 11, wherein the business intelligence is generated in real-time.

* * * * *